Dec. 22, 1936.  C. A. GUSTAFSON  2,064,829
ROAD MACHINE
Filed Dec. 21, 1933  2 Sheets-Sheet 1

INVENTOR.
Carl A. Gustafson
BY
ATTORNEY.

Dec. 22, 1936.  C. A. GUSTAFSON  2,064,829
ROAD MACHINE
Filed Dec. 21, 1933  2 Sheets-Sheet 2
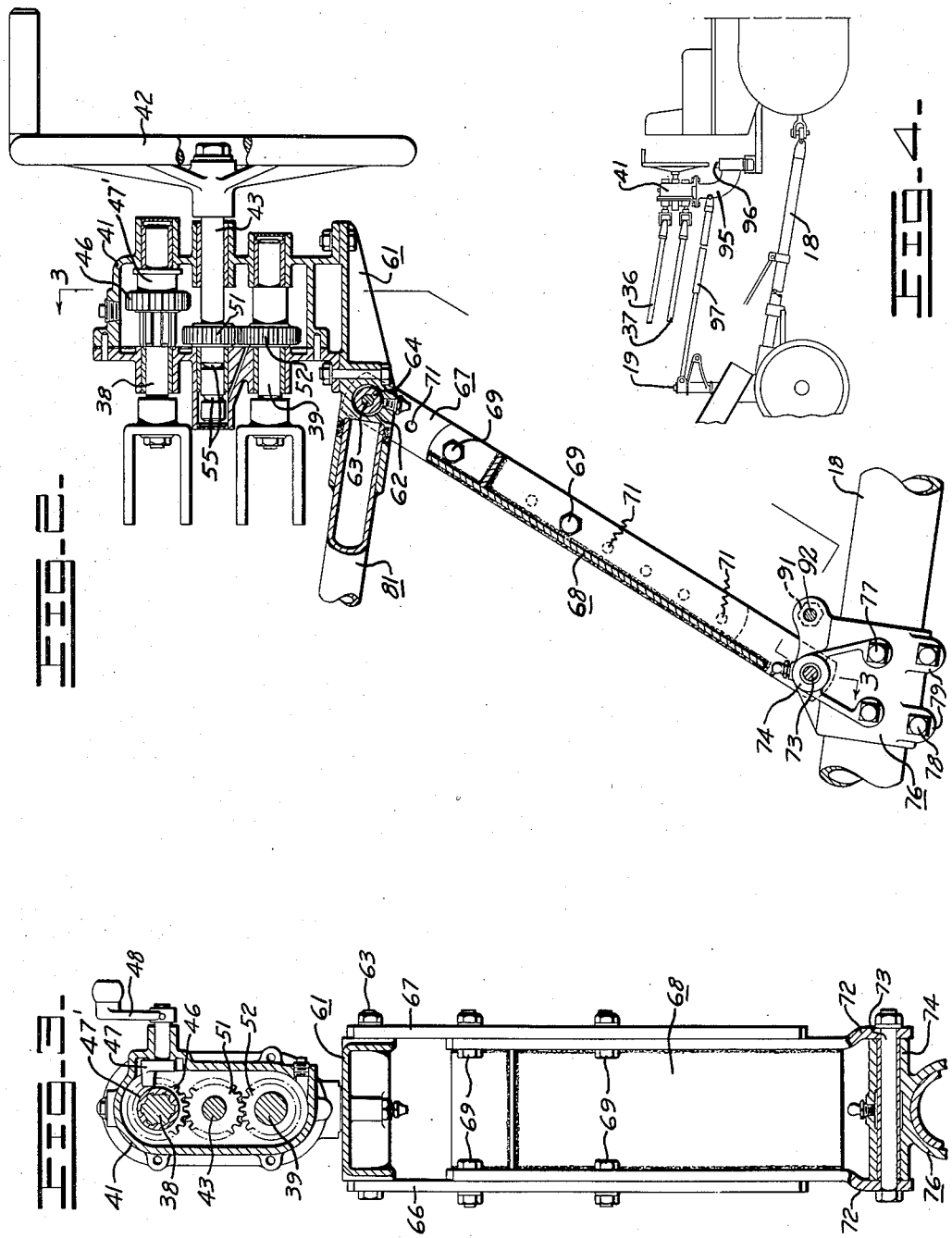
INVENTOR.
Carl A. Gustafson
BY Charles M. Fryer
ATTORNEY.

Patented Dec. 22, 1936

2,064,829

UNITED STATES PATENT OFFICE 2,064,829

ROAD MACHINE

Carl A. Gustafson, Peoria, Ill., assignor to Caterpillar Tractor Co., San Leandro, Calif., a corporation of California Application December 21, 1933, Serial No. 703,377

21 Claims. (Cl. 37—156)

The present invention relates to road machines, and more particularly to the provision of control means for controlling operation of earth-engaging means of a road machine; said control means being mounted on the road machine to provide for operation thereof from any type of draft vehicle.

It is an object of the invention to provide control means for the earth-working means of a road machine, which is mounted in an improved manner on the road machine to provide for operation thereof by an operator on the draft vehicle.

Another object of the invention is to provide, in a machine of the character related, improved means for mounting control means for an earth-engaging tool, whereby the control means can be moved from a position adjacent the operator whereat the control means is readily accessible to the operator, to a position out of the way of both the operator and the end of the draft vehicle to prevent interference when the machine, for example, is making sharp turns or going over steep ditches.

Another object of the invention is to provide an improved adjustable support for the tool control means, on the draft connection between the drawn and draft vehicles.

Another object of the invention is to provide control means for an earth-engaging tool which is mounted in an improved manner at the front of the road machine, and is adjustable to various positions in accordance with the position of the operator's station on the draft vehicle.

Another object of the invention is the provision of improved means for supporting control means, of the character described, on one vehicle of a train of vehicles at a location accessible to an operator on another vehicle of said train, in a manner to prevent damage to said control means and to mechanism connected therewith, or possible injury to the operator, which might otherwise be caused should the control means happen to be bumped by said another vehicle as a result of relative displacement between said vehicles.

Other objects will appear as the description progresses.

Fig. 2 is a vertical, longitudinal section through the control means and the support therefor.

Fig. 3 is a sectional view taken on the line 3—3 in Fig. 2.

Fig. 4 is a fragmentary side elevation, illustrating optional mounting of the control means on the draft vehicle.

Figure 1:
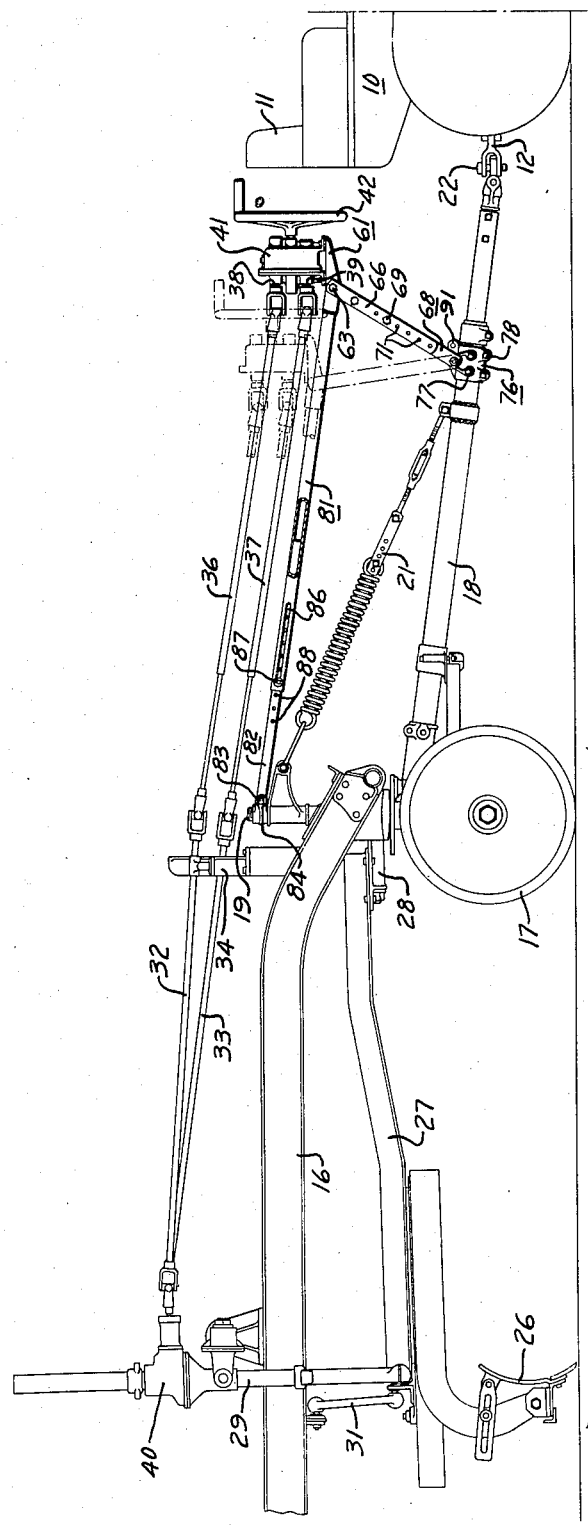
Fig. 1 is a partial side elevation of a road working apparatus including a draft vehicle, and a drawn vehicle having the tool control means mounted in accordance with the instant invention.

In the road working apparatus disclosed herein, the draft vehicle comprises any suitable tractor 10, preferably a track-type tractor, (Fig. 1) having seat 11 at the operator's station, and drawbar 12 to provide a draft connection therefrom to the drawn vehicle. The drawn vehicle comprises a road machine having a frame 16 supported on front wheels 17 and suitable rear wheels, not shown. Draft pole 18 is connected to front wheels 17 for pivotal movement therewith, about the axis of king bolt 19, pivotally supported in frame 16. Adjustable, resilient connection 21 extends from king bolt 19 to pole 18 to provide a support for the pole; the pole being connected to drawbar 12 of the tractor by pin 22.

The earth-working means of the road machine is mounted for vertical and angular adjustment on the frame of the machine. Earth-engaging tool 26 (Fig. 1) is adjustably supported, in the usual manner, on tool supporting frame 27 having a universal draft connection at 28 with frame 16. To accomplish vertical and angular adjustment of the tool, the tool supporting frame 27 is connected to frame 16 by similar telescopic lift links 29 and center shift link 31. Only one of the telescopic lift links 29 is seen in Fig. 1. Center shift link 31 is adjusted by any suitable means to fix the lateral position of the tool with respect to the frame. Telescopic adjustment of the lift links 29, which are universally connected to both the tool and the frame, is effected by suitable means, such as a nut and screw, through shafts 32, 33, supported in bracket 34 on frame 16 and universally connected to telescopic shafts 36, 37, respectively; the axes of the universal connections between shafts 32, 33 and 36, 37 being vertically aligned with the axis of king bolt 19 to allow for turning of the vehicle. Shafts 36, 37 are universally connected to shafts 38, 39 (Figs. 1 and 2) journaled in gear box 41 of the control means; and shafts 32, 33 are connected to lift links 29 by gear connections in boxes 40.

Gear box 41 houses selectively operable gear connections whereby shafts 38, 39 can be operated simultaneously or individually from hand wheel 42 on shaft 43, journaled in box 41 and mounted for sliding movement therein. Thus, it is seen that control means are provided for operating the adjusting mechanisms for the tool, to provide for selective operation thereof. The construction of selective gear connections for the control means and the various adjustments thereof will now be described.

Within gear box 41, shaft 38 (Figs. 2 and 3) has gear 46 slidably engaged with a splined portion thereof; slidable movement of the gear being controlled by crank 47, engaging in collar 47' fixed to gear 46 and movable by lever 48. By operating lever 48, gear 46 can be shifted from the position shown in Fig. 2 into engagement with gear 51, fixed on shaft 43 and meshing in the position shown in Fig. 2 with gear 52 fixed on shaft 39. In the position of hand wheel 42 and shaft 43 shown in Fig. 2, the control means is conditioned to determine operation of shaft 39 only, whereby one end of the earth-engaging tool can be moved. If hand wheel 42 be shifted to the right in Fig. 2 to mesh with gear 46, an operative connection is established for operating the telescopic lift link at the other end of the tool to raise or lower such end. If gear 46 be shifted to the left in Fig. 2 to mesh with gear 51, hand wheel 42 is connected to both shafts 38 and 39 to determine simultaneous operation of both of the lift links. For holding shaft 43 in either of its positions to which it can be moved, spaced grooves 55 are formed on the shaft in which a spring-pressed detent of usual construction is adapted to engage. It is seen, therefore, that selective control means are provided for operating the adjustable supporting means for the earth-engaging tool.

The control means is mounted on the draft connection between the drawn and draft vehicles, for vertical and longitudinal movement with respect thereto, whereby the position of the control means can be manipulated in accordance with the position of the operator's station on any draft vehicle which may be used. In addition, the mounting means for the control means provides for movement of the control means in any adjusted position thereof, from a position readily accessible to the operator's station of the draft vehicle to a position out of the way of such station and vice versa.

To accomplish these adjustments, gear box 41 is provided with an adjustable support on the draft pole of the road machine and with an adjustable connection with the frame of the machine. Gear box 41 (Fig. 2) is detachably secured on pivotally mounted bracket 61 which is apertured transversely at 62 to receive bolt 63, having sleeve 64 thereon and supported at its ends in spaced bars 66, 67 (Figs. 2 and 3). Bars 66, 67 are slidably engaged with the sides of channel bracket 68 having opposite pairs of bolts 69 positioned in spaced apertures therein. Bars 66, 67 are each provided with a plurality of similarly spaced apertures 71 whereby said bars are adjustably connected to bracket 68 by said bolts 69. Bracket 68 has spaced projections 72 (Fig. 3) at its lower end, apertured to receive bolt 73 mounted in boss 74 of bracket 76. Bracket 76 is secured on draft pole 18 by bolts 77 extending therethrough, and clamping bolts 78 passing through opposite apertured ears 79 of bracket 76. From the foregoing description, it is seen that an adjustable telescopic support is provided for the control means on the draft pole; the support being pivotally connected to said control means and to said pole.

The adjustable support for the control means can, therefore, be oscillated about its pivotal connection with the draft pole, such oscillation serving to displace the control means longitudinally of the draft pole and the road working apparatus. To allow for horizontal adjustment of the control means accomplished by the longitudinal displacement thereof, bracket 61 (Fig. 2) has a welded connection with hollow shaft 81 forming with shaft 82 (Fig. 1) a telescopic connection; shaft 82 being pivoted at 83 in bracket 84, pivoted on king bolt 19. Hollow shaft 81 has opposite aligned slots 86 (Fig. 1) adapted to receive bolt 87 mounted in a selected one of a plurality of apertures 88 in shaft 82. It is seen that the particular position of bolt 87 in a selected aperture 88 fixes the forward position of the control means with respect to the operator's station on the draft vehicle. The weight of the control means will hold it in a selected forward position as long as bracket 68 is at the right of the transverse vertical plane passing through lower pivot 73 of bracket 68. By virtue of slots 86 in shaft 81, the operator can at will move the control means rearwardly from the position shown in Fig. 1. Furthermore, it will be observed that if relative vertical displacement occurs between the drawn vehicle including its draft pole 18, and the draft vehicle 10, which would be caused for example by travel of the machine over an abrupt ditch, the control means in any adjusted position thereof is free to move rearwardly in a direction extending longitudinally of the machine by virtue of its yielding connection with the drawn vehicle. Consequently, if such relative displacement is great enough so as to cause the control means to bump against seat 11, the entire control means can swing backwardly away from the draft vehicle to thus avoid damage thereto and possible injury to an operator who might be manipulating the control means or have his hand overhanging the rear of the operator's seat. Should it be desired to move the control means out of the way entirely to the position indicated in dotted lines in Fig. 1, this can be done by moving the control means to the left of the previously mentioned vertical plane.

From the preceding description, it is seen that the control means can be adjusted horizontally and vertically to a position adjacent the operator's station on any draft vehicle which may be used with the road machine, and, further, that in any such adjusted position thereof, the control means can be moved from adjacent the operator's station to a position out of the way of such station and vice versa. Also, in any adjusted position thereof, the control means can automatically yield rearwardly to provide the safety feature pointed out. The adjustable mounting of the control means is of particular advantage, since it enables the trailer road machine to be employed with any type of draft vehicle, inasmuch as the control means can be suitably positioned in proper relationship to the operator's station, which station varies in position in the various types and sizes of draft vehicles.

Stop means is provided for limiting the forward pivotal movement of the adjustable support in the event the telescopic connection of the control means to the frame of the road machine is disconnected. Such means includes apertured ear 91 (Figs. 1 and 2) on bracket 76. A bolt 92 is adapted to be placed in the aperture in ear 91 to serve as a stop in the extreme forward position of the control means.

In case the purchaser of the road machine desires to employ the machine always with the same type of draft vehicle, the control means, since it is adapted for detachable mounting on bracket 61 mounted on the draft pole, can be also detachably mounted on bracket 95 mounted on the draft vehicle, as is illustrated by Fig. 4. Bracket 95 is mounted for pivotal movement on upright axis 96 and has telescopic aligning pole 97 pivotally connected thereto and to the king bolt 19 of the road machine, as with respect to pole 81 (Fig. 1); the connection and construction of control shafts 36 and 37 being the same as that previously described. Thus, optional mounting of the control means can be had.

Therefore, I claim as my invention:

1. In a road machine, a draft pole for connecting the machine to a draft vehicle, earth-working means adjustably mounted on said machine, adjusting means for said earth-working means including a gear box, and means for mounting said gear box on said pole, including a telescopic support pivotally connected to said pole and to said gear box, and a telescopic connection pivotally connected to said gear box and to said machine.

2. In a road machine, a draft pole for connecting the machine to a draft vehicle, earth-working means adjustably mounted on said machine, adjusting means for said earth-working means including a gear box, and means for mounting said gear box on said pole for vertical and horizontal adjustment with respect to the draft vehicle to compensate for varying heights and horizontally displaced positions of the operator's station on the draft vehicle with respect to said machine.

3. In a road machine, a draft pole for connecting the machine to a draft vehicle, earth-working means adjustably mounted on said machine, adjusting means for said earth-working means including a gear box, and means for mounting said gear box on said pole comprising an adjustable support providing for vertical adjustment of said gear box, and an adjustable connection between said gear box and said machine providing for horizontal adjustment of said gear box.

4. In a road machine, a draft pole for connecting the machine to a draft vehicle, earth-working means adjustably mounted on said machine, adjusting means for said earth-working means including a gear box, and means for mounting said gear box on said pole comprising an adjustable support providing for vertical adjustment of said gear box, and an adjustable connection between said gear box and said machine providing for horizontal adjustment of said gear box, said connection providing for movement of said gear box with respect to the draft vehicle in any adjusted position of said gear box.

5. In a road machine, a draft pole for connecting the machine to a draft vehicle, earth-working means adjustably mounted on said machine, adjusting means for said earth-working means including a gear box, and means for mounting said gear box on said pole comprising a telescopic support pivotally connected to said pole and to said gear box, a telescopic connection pivotally connected to said gear box and to said machine, and means for limiting movement of said support about the pivotal connection thereof with said pole when said telescopic connection is disconnected.

6. In a road machine, an earth-engaging tool, adjusting means for said tool, an operator's station, control means for operating said adjusting means, and means mounting said control means adjacent said station, comprising a movably mounted support for said control means, and means for limiting movement of said support, said limiting means providing stop means to maintain said support and said control means in any one of a plurality of positions with respect to said station.

7. In a road working apparatus, a draft vehicle, a drawn vehicle, means providing a draft connection between said vehicles, adjustable means on said drawn vehicle, means for operating said adjustable means from said draft vehicle, and means for adjustably mounting said operating means on said draft connection means for accessibility to an operator on said draft vehicle to provide for operation of said adjustable means from said draft vehicle.

8. In a road working apparatus, a draft vehicle, a drawn vehicle, means providing a draft connection between said vehicles, earth-working means on said drawn vehicle, means for adjusting said earth-working means, means for operating said adjusting means from said draft vehicle, and means mounting said operating means on said draft connection means, including an adjustable linkage providing for adjustment of said operating means with respect to said draft vehicle.

9. In a road working apparatus, a draft vehicle, a drawn vehicle, means providing a draft connection between said vehicles, earth-working means on said drawn vehicle, means for adjusting said earth-working means, means for operating said adjusting means from said draft vehicle, and means mounting said operating means on said draft connection means, including a plurality of adjustable connections providing for adjustment of said operating means while on said draft connection means to various positions with respect to said draft vehicle.

10. In a road working apparatus, a draft vehicle, a drawn vehicle, adjustable means on said drawn vehicle, operating means for said adjustable means including control means, and means for mounting said control means on said drawn vehicle for operation by an operator on said draft vehicle, including adjustable connections between said control means and said drawn vehicle providing for adjustment of said control means both longitudinally and as to height with respect to said draft vehicle.

11. In a road working apparatus, a draft vehicle, a drawn vehicle, adjustable means on said drawn vehicle, operating means for said adjustable means including control means, and means for mounting said control means on said drawn vehicle for operation by an operator on said draft vehicle including adjustable connections between said control means and said drawn vehicle providing for adjustment of said control means with respect to said draft vehicle, one of said connections having limited telescopic movement in any adjusted position thereof whereby said control means can be moved longitudinally away from said draft vehicle and vice versa.

12. In a road working apparatus, a draft vehicle, a drawn vehicle, adjustable mechanism on said drawn vehicle, control means for said adjustable mechanism including shafting and an operating member, supporting means for said control means, and means for adjustably mounting said supporting means on said drawn vehicle for movement to a selected position between said vehicles and adjacent said draft vehicle for accessibility to an operator on said draft vehicle.

13. In a road working apparatus, a draft vehicle, a drawn vehicle, adjustable mechanism on said drawn vehicle, control means for said adjustable mechanism, and means for adjustably mounting said control means on the drawn vehicle for both vertical and longitudinal movement to a selected position between said vehicles and adjacent said draft vehicle for accessibility to an operator on said draft vehicle.

14. In a road working apparatus, a train of vehicles, adjustable mechanism on one of said vehicles, an operator's station on another of said vehicles, control means for said adjustable mechanism, and means mounting said control means on said one vehicle both for horizontal swinging adjustment and for vertical adjustment while on said one vehicle to position said control means at a selected accessible position with respect to said operator's station on said another vehicle.

15. In a road working apparatus, a vehicle having an operator's station thereon, a second vehicle, adjustable mechanism on said second vehicle, control means for said adjustable mechanism including a control box unit having gearing therein for transmitting selected drives to said adjustable mechanism, and adjustable means supporting said unit to enable swinging movement of said unit to a selected position readily accessible with respect to said operator's station.

16. In a road working apparatus, a vehicle having an operator's station thereon, a second vehicle, adjustable mechanism on said second vehicle, control means for said adjustable mechanism including a control box unit having gearing therein for transmitting selected drives to said adjustable mechanism, adjustable means supporting said unit to enable swinging movement of said unit to and away from a selected position readily accessible with respect to said operator's station, and means for holding said unit in the selected position.

17. In a road working apparatus, a road machine adapted for connection to varying types of power units for propelling said machine, each power unit having an operator's station, adjustable mechanism mounted on said machine, control means for said adjustable mechanism, and means for adjustably mounting said control means on said machine for swinging movement to a selected position accessible to the operator's station of any selected power unit.

18. In a road working apparatus, a train of vehicles, adjustable mechanism on one of said vehicles, an operator's station on another of said vehicles, control means for said adjustable mechanism, means supporting said control means on said one vehicle for accessibility with respect to said operator's station, and a yieldable connection between said supporting means and said one vehicle providing for movement of said control means should said another vehicle bump against said control means.

19. In a road working apparatus, a train of vehicles, adjustable mechanism on one of said vehicles, an operator's station on another of said vehicles, control means for said adjustable mechanism, means for adjustably supporting said control means on said one vehicle for movement to a selected position accessible to said operator's station, and a yieldable connection between said adjustable supporting means and said one vehicle providing for movement of said control means should said another vehicle bump against said control means.

20. In a road working apparatus, a draft vehicle having an operator's station thereon, a drawn vehicle including a draft pole connection between said vehicles, adjustable mechanism on said drawn vehicle, control means for said adjustable mechanism including a control box unit having gearing therein for transmitting selected drives to said adjustable mechanism, means supporting said control unit on said draft pole connection at a location between said vehicles for accessibility with respect to said operator's station, and a yieldable connection between said supporting means and said drawn vehicle provding for movement of said control unit should said draft vehicle bump against said control unit.

21. In a road working apparatus, a train of vehicles, adjustable mechanism on one of said vehicles, an operator's station on another of said vehicles, control means for said adjustable mechanism including a control unit having means for transmitting selected drives to said adjustable mechanism, supporting means for said control unit associated with said one vehicle, said supporting means being adjustable both as to height and longitudinally with respect to said another vehicle to position said control unit for accessibility to said operator's station on said another vehicle, and a yieldable connection between said supporting means and said one vehicle providing for movement of said control unit in a direction away from said another vehicle in any adjusted position of said supporting means.

CARL A. GUSTAFSON.